US011010095B2

(12) United States Patent
Richter et al.

(10) Patent No.: US 11,010,095 B2
(45) Date of Patent: May 18, 2021

(54) DYNAMIC AND ADAPTIVE DATA READ REQUEST SCHEDULING

(71) Applicant: Western Digital Technologies, Inc., San Jose, CA (US)

(72) Inventors: Elkana Richter, Tene (IL); Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/522,505

(22) Filed: Jul. 25, 2019

(65) Prior Publication Data

US 2021/0026559 A1    Jan. 28, 2021

(51) Int. Cl.
*G06F 3/06* (2006.01)
*G06F 13/28* (2006.01)

(52) U.S. Cl.
CPC .......... *G06F 3/0659* (2013.01); *G06F 3/0611* (2013.01); *G06F 3/0679* (2013.01); *G06F 13/28* (2013.01)

(58) Field of Classification Search
CPC .... G06F 3/0659; G06F 3/0611; G06F 3/0679; G06F 13/28
See application file for complete search history.

(56) References Cited

U.S. PATENT DOCUMENTS

| 6,938,143 | B2 | 8/2005 | Le |
| 7,281,077 | B2 | 10/2007 | Woodral |
| 8,341,311 | B1 | 12/2012 | Szewerenko et al. |
| 9,727,248 | B2 | 8/2017 | Sarcone et al. |
| 2014/0229131 | A1* | 8/2014 | Cohen ............ G11C 16/26 702/64 |
| 2016/0267011 | A1 | 9/2016 | Chang et al. |
| 2016/0291868 | A1 | 10/2016 | Halaharivi |
| 2017/0371825 | A1 | 12/2017 | Huang |

(Continued)

FOREIGN PATENT DOCUMENTS

CN     105045526 A    11/2015

OTHER PUBLICATIONS

Gaidhani, Hemant; "Improving Mircrosoft Exchange Performance Using Sandisk Solid State Drives (SSDs)" White Paper; https://www.sandisk.in/content/dam/sandisk-main/en_us/assets/resources/enterprise/white-papers/improving-microsoft-exchange-performance-using-sandisk-ssds.pdf; Western Digital Corporation, 2016 (7 pages).

(Continued)

*Primary Examiner* — Eric Cardwell
(74) *Attorney, Agent, or Firm* — Patterson & Sheridan, LLP; Steven H. Versteeg

(57) ABSTRACT

The present disclosure generally relates to a method and device for improving data read request scheduling in storage devices. When a connection between a host computer and a storage device is established, a controller of the storage device sets a maximum outstanding read requests threshold for the storage device, based on the host-device connection protocol. The maximum outstanding read requests threshold can be dynamically adjusted in response to changes in the host-device connection protocol. Further, a latency tracker of the controller may be used to measure latency between the host computer and the storage device and adjust the maximum outstanding read requests threshold accordingly.

20 Claims, 5 Drawing Sheets

(56) References Cited

U.S. PATENT DOCUMENTS

2019/0027848 A1    1/2019  Kajiwara et al.
2019/0179757 A1*   6/2019  Walker ................ G06F 11/3466
2019/0278477 A1    9/2019  Benisty
2020/0174938 A1*   6/2020  Shergill .............. G06F 12/0868

OTHER PUBLICATIONS

Altavilla, Dave; "Samsung Launches High Performance, Ultra-Low Latency Z-SSD to take onIntel Optane", Samsung Electromics; https://www.forbes.com/sites/davealtavilla/2018/01/30/samsung-launches-high-performance-ultra-low-latency-z-ssd/#f1d05704d78f; Jan. 30, 2018 (1 page).

* cited by examiner

DYNAMIC AND ADAPTIVE DATA READ REQUEST SCHEDULING

BACKGROUND OF THE DISCLOSURE

Field of the Disclosure

Embodiments of the present disclosure generally relate to a method and device for improving scheduling of data read requests of storage devices.

Description of the Related Art

Storage devices, such as solid state devices (SSD), are connected to host computers by a data transfer bus. From the perspective of the host computer, optimal performance of the storage device is achieved when the data transfer bus in continually in full use. For example, for read requests from the storage device to the host computer, optimal performance of a data bus would mean the storage device maintains a pipeline of read requests from the host computer, allowing for full usage of the data transfer bus.

The storage device must allocate memory space for all read requests in the pipeline, so a limit of the number of outstanding data read requests is used to restrict memory usage at the storage device. In existing systems, a static limit on outstanding read requests is used. However, the optimal number of outstanding read requests can vary with system configuration, particularly the latency between the host computer and the storage device. For high latency connections, many more data transfer requests need to be in the pipeline at once to allow full usage of the data transfer bus, compared to low latency connections.

Because existing systems must account for the worst case scenario, existing systems use static limits compatible with high latency connections, and there is an inefficiency of read request scheduling for low latency connections. In particular, more memory needs to be reserved within the storage device to account for the large number of outstanding read requests than is needed in a low latency connection. Further, since the transfer requests can be returned out of order, reordering circuitry is more complicated for systems with high numbers of outstanding read requests. Further still, because the latency of a specific transfer request could be high in a system with many outstanding requests, unwanted timeouts may occur for some data transfer requests, resulting in wasted transfer and processing resources.

Thus, systems and methods are needed which improve read request scheduling for storage devices.

SUMMARY OF THE DISCLOSURE

The present disclosure generally relates to a method and device for improving data read request scheduling in storage devices. When a connection between a host computer and a storage device is established, a controller of the storage device sets a maximum outstanding read requests threshold for the storage device, based on the host-device connection protocol. The maximum outstanding read requests threshold can be dynamically adjusted in response to changes in the host-device connection protocol. Further, a latency tracker of the controller may be used to measure latency between the host computer and the storage device and adjust the maximum outstanding read requests threshold accordingly.

In one embodiment, a storage device including a non-volatile memory and a controller is provided. The controller is configured to, upon connection of the storage device to a host computer, establish a dynamic read request threshold for data read requests from the storage device to the host computer.

In another embodiment, a storage device is provided. The storage device, includes a non-volatile memory and a controller coupled to the non-volatile memory. The controller is configured to determine a connection has been established between a storage device and a host computer, determine an initial value for a dynamic read request threshold for the storage device, transmit at least one data read request from the storage device to the host computer and adjust the initial value for the dynamic read request threshold based on transmitting the at least one data read request.

In another embodiment, a storage device including a non-volatile memory and means to dynamically adjust a read request threshold is provided.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a method and device for improving data read request scheduling in storage devices. When a connection between a host computer and a storage device is established, a controller of the storage device sets a maximum outstanding read requests threshold for the storage device, based on the host-device connection protocol. The maximum outstanding read requests threshold can be dynamically adjusted in response to changes in the host-device connection protocol. Further, a latency tracker of the controller may be used to measure latency between the host computer and the storage device and adjust the maximum outstanding read requests threshold accordingly.

Figure 1:
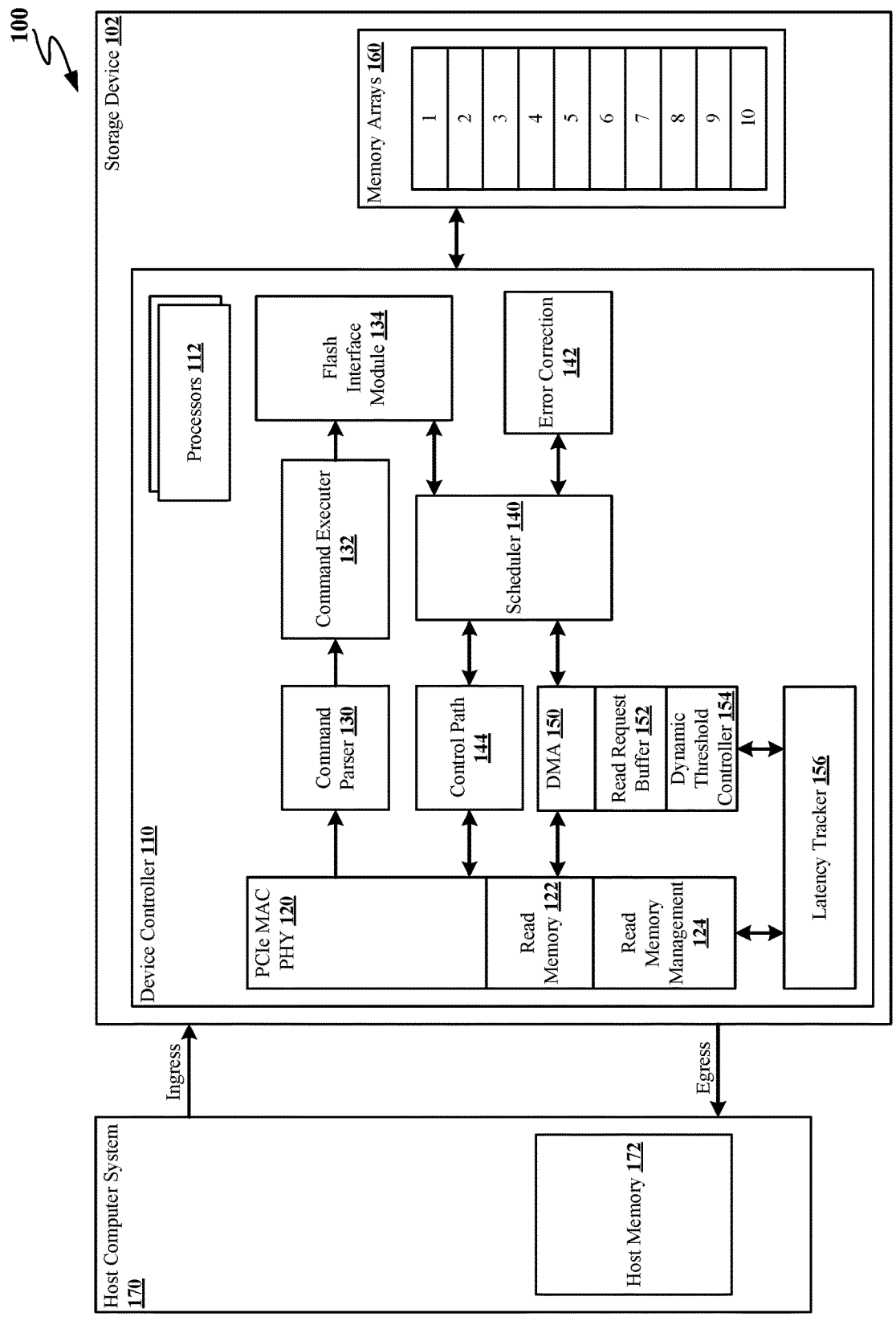
FIG. 1 is a block diagram of an example computing system including a host computer system and a storage device.

FIG. 1 is a block diagram of an example computing system 100 including a host computer system 170 and a storage device 102, such as a solid state drive, for host computer system 170. Host computer system 170 may utilize a non-volatile memory (NVM) included in storage device 102 (shown as memory arrays 160) to write and to read data, such as for long term memory storage. Storage device 102 may be an internal storage drive, such as a notebook hard drive or a desktop hard drive. Storage device 102 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. Storage device 102 may take the form of an embedded mass storage device, such as an eSD/eMMC embedded flash drive, embedded in host computer system 170. Storage device 102 may also be any other type of internal storage device, removable storage device, embedded storage device, external storage device, or network storage device.

Host computer system 170 may be a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving).

Host computer system 170 includes a host memory 172, such as DRAM or other main memories. An application program may be stored to host memory 172 for execution by components of host computer system 170. Host memory 172 may include host queue, such as command submission queues and command completion queues. Host memory 172 may include data buffers, such as a host data buffer.

Storage device 102, includes MAC and PHY components 120, for ingress of communications from host computer system 170 to storage device 102 and egress of communications from storage device 102 to host computer system 170. A link between storage device 102 and host computer system 170 may be any appropriate link, such as a Peripheral Component Interface Express (PCIe) link in this example. A PCIe link may one to thirty-two lanes, depending on the number of available PHYs connecting two PCIe connectors. The PCIe link is typically set during end point device initialization, such as initialization of storage device 102.

The link between host computer system 170 and storage device 102 operates under a communication protocol, such as PCIe serial communication protocol or other suitable communication protocols. Other suitable communication protocols include ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols. In other examples, storage device 102 may also be connected to host computer system 160 through a switch or a bridge.

In the PCIe communication protocol, host computer system 170 and storage device 102 may send requests to each other as transport layer packets (TLPs). TLPs may include an optional TLP prefix, a TLP header, a data payload, and an optional TLP digest. A TLP header includes a type field, which may indicate types of transactions.

As TLPs are transferred between host computer system 170 and storage device 102, a data link layer and physical layer are added to each TLP to ensure the TLP arrives at the intended destination. Each TLP includes a certain overhead from the added data link layer and physical layer. For example, TLP may include an optional end-to-end cyclic redundancy checksum (ECRC) in TLP digest. A data link layer adds the sequence number and link layer CRC (LCRC) to the TLP to ensure successful transmission across the link. A physical layer adds information to mark the beginning and end of the TLP.

For example, storage device 102 may issue a host read request to host computer system 170 to read data from host memory 172. The associated data of the request is also transferred as a data payload of the TLPs. For example, a host memory read request TLP may be issued by storage device 102 to host computer system 170, and host computer system 170 sends the requested data as a data payload in one or more completion TLPs.

Memory arrays 160 of storage device 102 may be configured for long-term storage of information as non-volatile memory space and retains information after power on/off cycles. Memory arrays 160 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in storage device 102. Each platter may contain one or more regions of one or more tracks of data. Memory arrays 160 may additionally include one or more types of non-volatile memory.

Storage device 102 includes a device controller 110 which manages operations of storage device 102, such as writes to and reads from memory arrays 160. Controller 110 includes one or more processors 112, which may be multi-core processors. Processors 112 handle the components of storage device 102 through firmware code.

Controller 110 may operate under NVM Express (NVMe) protocol, but other protocols are applicable. NVMe protocol is a communications interface/protocol developed for SSDs to operate over a host and storage device linked over a PCIe interface. NVMe protocol provides a command submission queue and command completion queue for access of data stored in storage device 102 by host computing system 170. Storage device 102 may fetch or read host commands from a command submission queue of host queues of host memory 172.

Controller 110 executes computer-readable program code (e.g., software or firmware) executable instructions (herein referred to as "instructions"). The instructions may be executed by various components of controller 110, such as processors 112, logic gates, switches, application specific integrated circuits (ASICs), programmable logic controllers, embedded microcontrollers, and other components of controller 110.

The instructions are stored in a non-transitory computer readable storage medium. In certain embodiment, the instructions are stored in a non-transitory computer readable storage medium of storage device 102, such as in a read-only memory or memory arrays 160. Instructions stored in storage device 102 may be executed without added input or directions from host computer system 170. In other embodiments, the instructions are transmitted from host computer system 170. The controller 110 is configured with hardware and instructions to perform the various functions described herein and shown in the figures.

Storage device 102 also includes other components, such as flash interface module 134, a direct memory access (DMA) module 150, a scheduler 140, an error correction module 142, a command executor 132, and a control path 144. Flash interface module 134 interacts with memory arrays 160 for read and write operations. Scheduler 140 controls the data transfer while activating control path 144 for fetching physical page regions (PRPs), posting completion and interrupts, and activating the DMA module 150 for the actual data transfer between host computing system 170 and storage device 102. Error correction module 142 corrects the data fetched from memory arrays 160. Command parser 130 fetches commands to command executor 132 for execution on flash interface module 134.

DMA module 150 executes data transfers between host computing system 170 and storage device 102. In this example, DMA module 150 includes read request buffer 152 and dynamic threshold controller 154. Read request buffer 152 is a buffer of outstanding read requests from storage device 102 to host computing system 170 (e.g., storage device 102 requesting data from host memory 172). Dynamic threshold controller 154 is used to establish and adjust a dynamic read request threshold to apply to read request buffer 152, as described in further detail below.

Device controller 110 further includes latency tracker 156, which is used to track the latency over the link between host computer system 170 and storage device 102. The latency over the link can be used to establish or adjust the dynamic read request threshold by dynamic threshold controller 154.

When transmitting a read request to host computer system 170, device controller 110 reserves space in memory for the data to be transferred in response to the read request. This memory reserved is read memory 122 within MAC PHY 120. In general, a larger number of outstanding read requests means a larger read memory 122 is reserved. When a read request response is received, read memory management 124 re-orders the data received (if necessary) so that the proper data is stored to the reserved space in read memory 122. In general, a system supporting a larger number of read requests must include a more complicated read memory management 124 to fully perform reordering of read request responses.

Figure 2A:
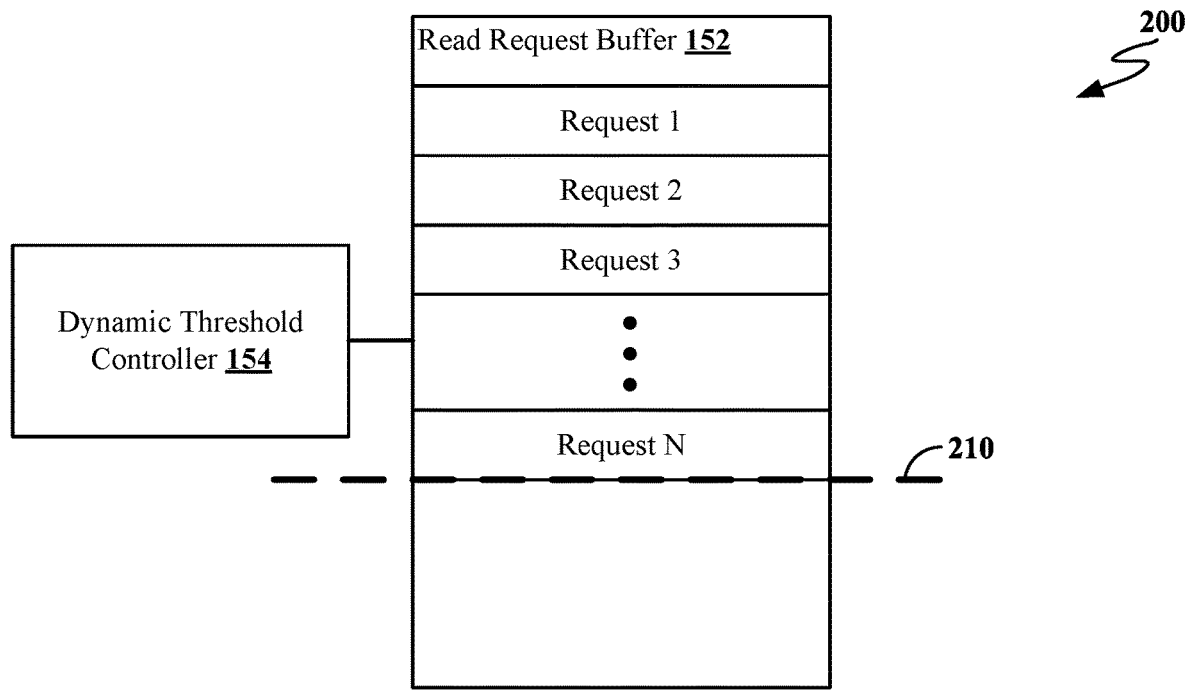
FIGS. 2A and 2B are diagrams of read request buffer with a dynamic read request threshold, according to one embodiment.

FIG. 2A is a diagram 200 of read request buffer 152 with a dynamic read request threshold. In general, read request buffer 152 is part of a DMA module of a storage device controller, such as device controller 110 of FIG. 1. Read request buffer 152 includes a record of all outstanding read requests from a storage device to a host computer. In this example, read request buffer 152 includes requests 1-3 as well as request N, although in general the number of read requests within read request buffer 152 may vary.

Read request buffer 152 is connected to dynamic threshold controller 154. Dynamic threshold controller 154 establishes dynamic read request threshold 210 on read request buffer 152. As shown, read request buffer 152 is currently full up to dynamic read request threshold 210, preventing further requests, although room for more requests does exist within read request buffer 152. Based on analysis by dynamic threshold controller 154, dynamic read request threshold 210 may be adjusted, in response to changes in the link between the storage device and the host computer, or in response to latency measurements of the link.

Figure 2B:
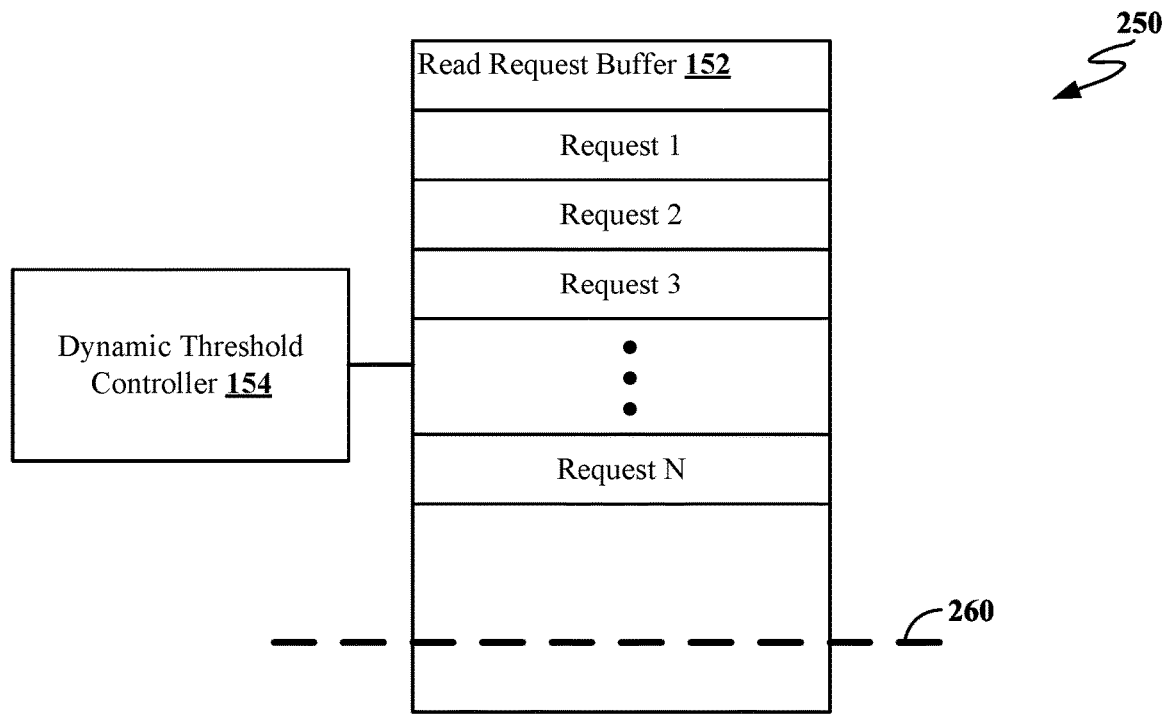

FIG. 2B is a diagram 250 of read request buffer 152 after adjustment of dynamic read request buffer 260. In this example, dynamic threshold controller 154 has adjusted dynamic read request buffer 260 up, allowing for more requests within read request buffer 152. Adjusting dynamic read request buffers may be in response to a determination by dynamic threshold controller 154 of high latency between the storage device and the host computer, or based on a change in the link between the storage device and the host computer.

Figure 3:
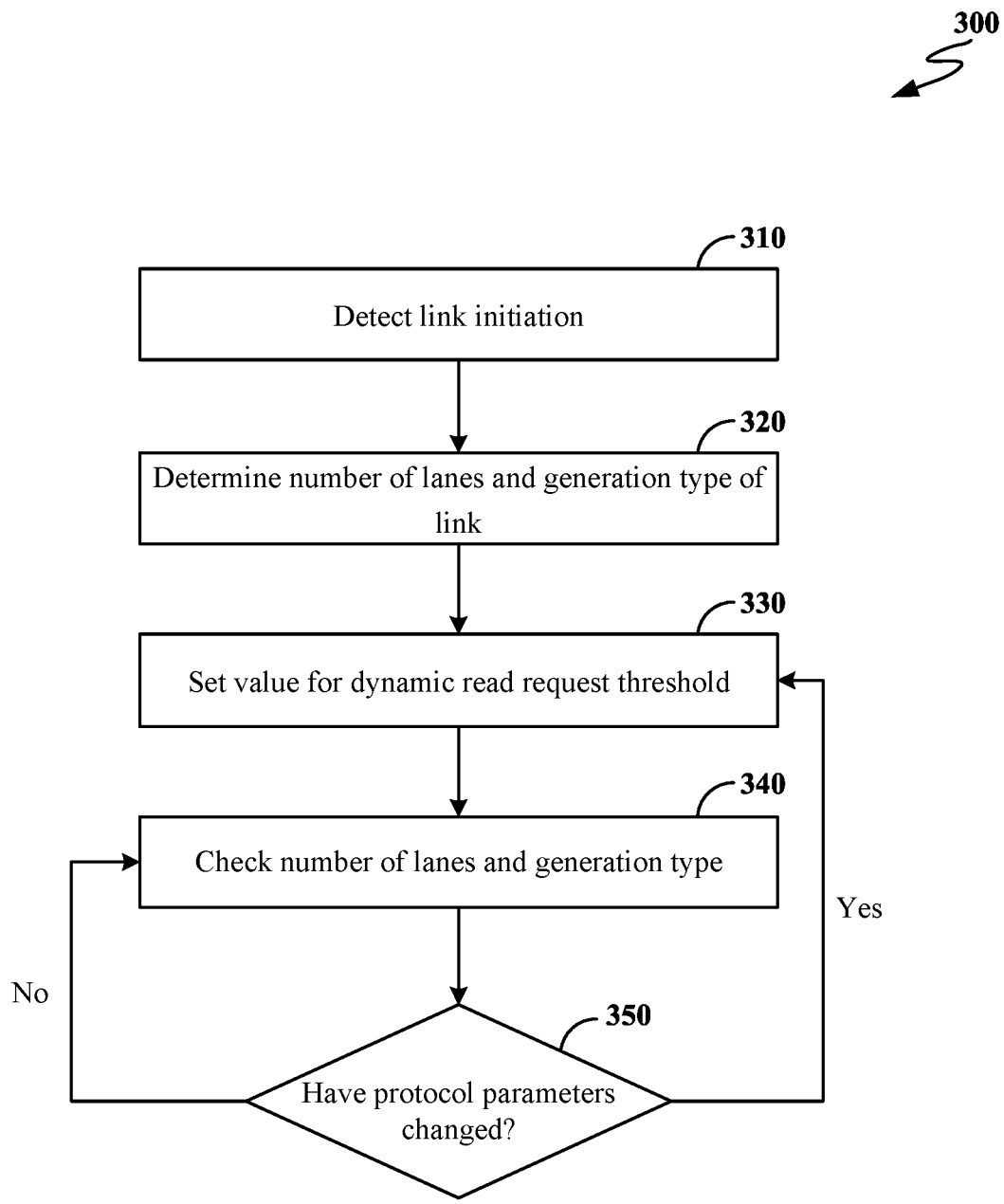
FIG. 3 is a flow diagram of an example method for determining a dynamic read request threshold using host-device protocol parameters.

FIG. 3 is a flow diagram of an example method 300 for determining a dynamic read request threshold using host-device protocol parameters. Method 300 may be performed by a dynamic threshold controller, such as dynamic threshold controller 154 of FIG. 1. Method 300 starts at 310, where the dynamic threshold controller detects an initiation of a link between a storage device and a host computer. The detection may be made based on information transmitted to dynamic threshold controller by a device controller of the storage device.

At 320, the dynamic threshold controller determines the number of lanes and the generation type of the link between the storage device and the host computer. As discussed above, a PCIe link may include up to thirty two lanes. The generation type refers to the specific generation of communication protocol in use. Collectively, the number of lanes in use and the generation type are called the protocol parameters of the link.

At 330, based on the protocol parameters, the dynamic threshold controller determines and sets an initial value for a dynamic read request threshold. In general protocol parameters indicative of a slow (e.g., high latency) link result in relatively high dynamic read request thresholds, while protocol parameters indicative of a fast link result in relatively low dynamic read request thresholds.

At 340 the dynamic threshold controller begins to monitor the link for changes to the protocol parameters. At 350 the dynamic threshold controller determines if the protocol parameters have changed. If the protocol parameters have not changed, method 300 returns to 340 and monitoring of the link continues. If the protocol parameters have changed, method 300 returns instead to 330, where the dynamic threshold controller determines and sets a new dynamic read request threshold based on the changed protocol parameters. For example, an increase in the number of lanes may result in a lower dynamic read request threshold, and a decrease in the number of lanes may result in a higher dynamic read request threshold. Thereafter, dynamic threshold controller resumes monitoring the link for changes at 340. Method 300 continues until the link is disestablished.

Figure 4:
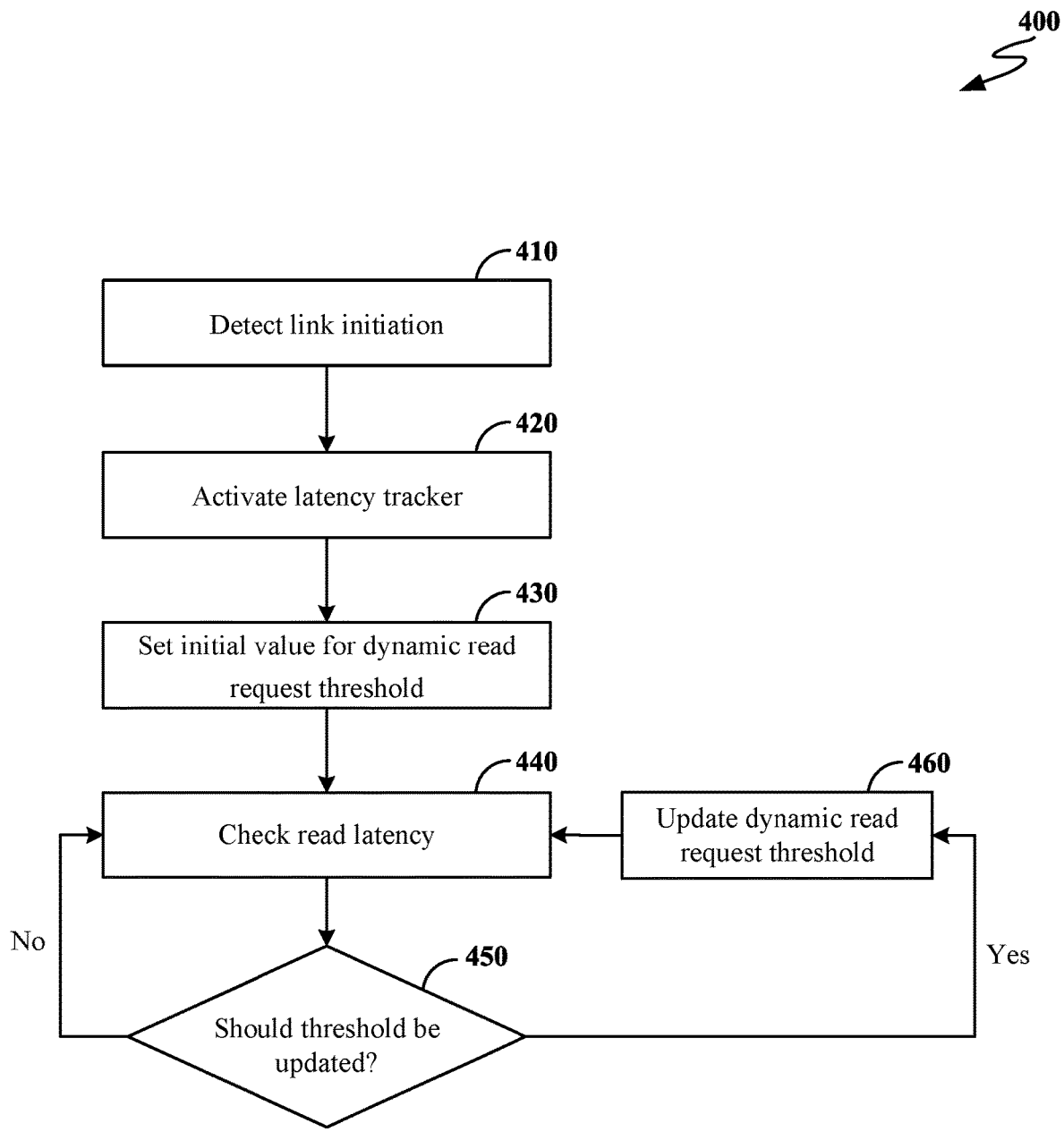
FIG. 4 is a flow diagram of an example method for determining a dynamic read request threshold using latency tracking.

FIG. 4 is a flow diagram of an example method 400 for determining a dynamic read request threshold using latency tracking. Method 400 may be performed by a dynamic threshold controller, such as dynamic threshold controller 154 of FIG. 1. Method 400 begins at 410, where the dynamic threshold controller detects an initiation of a link between a storage device and a host computer. After detecting link initiation, at 420, the dynamic threshold controller activates a latency tracker within a device controller of the storage device. The latency tracker is used as described above to measure the actual read latency between the storage device and the host computer, that is, the average response time in read requests from the storage device to the host computer.

At 430 the dynamic threshold controller sets an initial value for a dynamic read request threshold. The initial value may be a standard value for the storage device based on the capacity the storage device memory. In other examples, the initial value may be based on protocol parameters of the link, such as described in method 300 of FIG. 3. If so, the initial value may be based on an expected latency of the link, based on the protocol parameters.

At 440, the dynamic threshold controller checks the read latency as measured by the latency tracker. Read latency may be checked on a periodic basis, such as after a set passage of time, or upon receipt of a request response from the host computer.

Based on the checked read latency, at 450, the dynamic threshold controller determines if the dynamic read request threshold should be updated. On the first pass, the determination at 450 may be made based on a significant change in the read latency compared to the initial value for the dynamic read request threshold. On subsequent passes, the determination at 450 may be made based on a significant change in the read latency compared to the last checked read latency value.

If the threshold should not be updated, method 400 returns to 440, where monitoring of read latency is resumed. If the threshold should be updated, method 400 proceeds to 460, where the dynamic threshold controller updates the dynamic read request threshold. Thereafter, monitoring of the read latency resumes at 440.

In some embodiments, a combination of the methods described in FIGS. 3 and 4 may be used. For example, a dynamic threshold controller may establish an initial value for a dynamic read request threshold based on protocol parameters of a link between a storage device and a host computer. Then, the value of the dynamic read request threshold may be adjusted based on measured read latency of the link, in addition to detected changes in the protocol parameters of the link.

Figure 5:
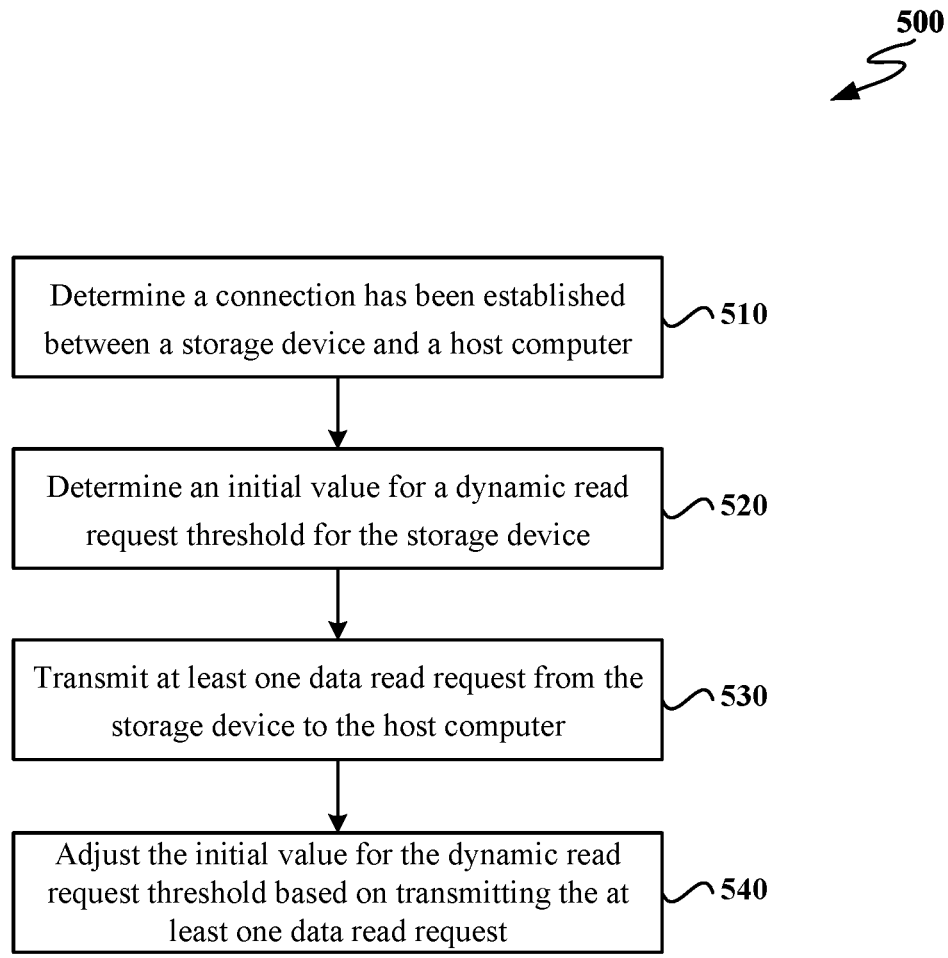
FIG. 5 is a flow diagram of an example method for setting a dynamic read request threshold for a storage device.

FIG. 5 is a flow diagram of an example method 500 for setting a dynamic read request threshold for a storage device. Method 500 may be performed by a device controller, such as device controller 110 of FIG. 1. Method 500 begins at 510, where the device controller determines a connection has been established between a storage device coupled to the device controller, and a host computer. As discussed above, the connection may be an NVMe connection over PCIe.

At 520, the device controller determines an initial value for a dynamic read request threshold for the storage device. As discussed above, the initial value may be based on an established initial value for the storage device, or may be based on the protocol parameters of the connection between the storage device and the host computer. In general, the initial value may be the best guess of the device controller of the expected latency of the connection.

At 530, the device controller transmits at least one data read request from the storage device to the host computer. In general, data read requests are made to access particular data stored within the host computer, to be moved to storage within memory of the storage device.

At 540, the device controller adjusts the initial value for the dynamic read request threshold based on transmitting the at least one data read request. For example, the transmission may result in a determination that the latency of the connection is higher or lower than projected or expected when the initial value was established. In other cases, the transmission may indicate that the connection has changed, such as, in the case of a PCIe link connection, that the connection is now utilizing fewer or more lanes than before.

By using a dynamic read request threshold in a storage device, a number of advantages over existing storage device performance may be realized. Because existing storage device systems utilize static read request thresholds, those existing systems are inefficient for low latency connections. Compared to existing systems, storage devices using dynamic read request thresholds are less vulnerable to timeouts from long read request response times. Further, the reordering of the read data from a host computer to the storage device is simpler for storage devices using a dynamic read request threshold. Further still, because less memory must be reserved by the storage device using a dynamic read request threshold, more resources of the storage device are available for other tasks.

In one embodiment, a storage device comprises a non-volatile memory; and a controller configured to, upon connection of the storage device to a host computer, establish a dynamic read request threshold for data read requests from the storage device to the host computer. The storage device further comprises a latency tracker configured to measure a read latency between the storage device and the host computer. The controller is configured to adjust the dynamic read request threshold based on the read latency between the storage device and the host computer. The controller is configured to establish the dynamic read request threshold based on a host-device protocol between the storage device and the host computer. The controller being further configured to detect a change in the host-device protocol and adjust the dynamic read request threshold based on the change in the host-device protocol. The storage device further comprises a latency tracker configured to measure a read latency between the storage device and the host computer and the controller is further configured to establish the dynamic read request threshold based on a host-device protocol between the storage device and the host computer and adjust the dynamic read request threshold based on the read latency between the storage device and the host computer. The controller further comprises a latency tracker coupled to a dynamic threshold controller. The controller further comprises a read request buffer coupled to the dynamic threshold controller. The controller further comprises a DMA coupled to the read request buffer.

In another embodiment, a storage device, comprises a non-volatile memory and a controller coupled to the non-volatile memory, the controller is configured to determine a connection has been established between a storage device and a host computer, determine an initial value for a dynamic read request threshold for the storage device, transmit at least one data read request from the storage device to the host computer and adjust the initial value for the dynamic read request threshold based on transmitting the at least one data read request. Determining the initial value for the dynamic read request threshold comprises determining a host-device protocol of the connection and establishing the initial value based on the host-device protocol. The controller is configured to detect a change in the host-device protocol, wherein the initial value for the dynamic read request is adjusted based on the change in the host-device protocol. Adjusting the initial value for the dynamic read request threshold based on transmitting the at least one data read request comprises receiving a read latency measurement from a latency tracker and adjusting the initial value based on the read latency measurement. The controller further comprises a read request buffer. The controller further comprises a latency tracker. The controller further comprises a dynamic threshold controller.

In another embodiment, a storage device, comprises a non-volatile memory and means to dynamically adjust a read request threshold. The storage device further comprises means to track latency. The storage device further comprises means to detect a change in host-device protocol. The storage device further comprises means to adjust an initial value for the read request threshold based on transmitting a data read request.

While the foregoing is directed to embodiments of the present disclosure, other and further embodiments of the disclosure may be devised without departing from the basic scope thereof, and the scope thereof is determined by the claims that follow.

What is claimed is:

1. A storage device comprising:
a non-volatile memory; and
a controller coupled to the non-volatile memory, wherein the controller is configured to:
establish a dynamic read request threshold for data read requests from the storage device to a host computer upon connection of the storage device to the host computer, wherein the dynamic read request threshold is a number of read requests, wherein the dynamic read request threshold is adjusted based on a change in a host-device protocol parameter, and wherein the host-device protocol parameter comprises a number of lanes; and
adjust, based on the dynamic read request threshold, a size of a reserved space of a read memory for data to be transferred to in response to the number of read requests, wherein the size of the reserved space is substantially equal to the dynamic read request threshold.

2. The storage device of claim 1, further comprising a latency tracker configured to measure a read latency between the storage device and the host computer.

3. The storage device of claim 2, the controller being further configured to adjust the dynamic read request threshold based on the read latency between the storage device and the host computer.

4. The storage device of claim 1, wherein the controller is configured to establish the dynamic read request threshold based on the host-device protocol between the storage device and the host computer.

5. The storage device of claim 4, the controller being further configured to:
detect a change in the host-device protocol; and
adjust the dynamic read request threshold based on the change in the host-device protocol.

6. The storage device of claim 1, further comprising a latency tracker configured to measure a read latency between the storage device and the host computer, wherein the controller is further configured to:
establish the dynamic read request threshold based on a host-device protocol between the storage device and the host computer; and
adjust the dynamic read request threshold based on the read latency between the storage device and the host computer.

7. The storage device of claim 1, wherein the controller further comprises a latency tracker coupled to a dynamic threshold controller.

8. The storage device of claim 7, wherein the controller further comprises a read request buffer coupled to the dynamic threshold controller.

9. The storage device of claim 8, wherein the controller further comprises a direct memory access (DMA) coupled to the read request buffer.

10. A storage device, comprising:
a non-volatile memory; and
a controller coupled to the non-volatile memory, the controller is configured to:
determine a connection has been established between a storage device and a host computer;
determine an initial value for a dynamic read request threshold for the storage device, wherein the dynamic read request threshold is a number of read requests;
transmit at least one data read request from the storage device to the host computer;
adjust the initial value for the dynamic read request threshold based on transmitting the at least one data read request, wherein the dynamic read request threshold is adjusted based on a host-device protocol parameter, and wherein the host-device protocol parameter comprises a number of lanes; and
adjust, based on the dynamic read request threshold, a size of a reserved space of a read memory for data to be transferred to in response to the number of read requests, wherein the size of the reserved space is substantially equal to the dynamic read request threshold.

11. The storage device of claim 10, wherein determining the initial value for the dynamic read request threshold comprises:
determining a host-device protocol of the connection; and
establishing the initial value based on the host-device protocol.

12. The storage device of claim 11, wherein the controller is further configured to detect a change in the host-device protocol, wherein the initial value for the dynamic read request is adjusted based on the change in the host-device protocol.

13. The storage device of claim 11, wherein adjusting the initial value for the dynamic read request threshold based on transmitting the at least one data read request comprises:
receiving a read latency measurement from a latency tracker; and
adjusting the initial value based on the read latency measurement.

14. The storage device of claim 10, wherein the controller further comprises a read request buffer.

15. The storage device of claim 10, wherein the controller further comprises a latency tracker.

16. The storage device of claim 10, wherein the controller further comprises a dynamic threshold controller.

17. A storage device, comprising:
a non-volatile memory;
means to dynamically adjust a read request threshold, wherein the read request threshold is a number of read requests, wherein the read request threshold is adjusted based on a host-device protocol parameter, and wherein the host-device protocol parameter comprises a number of lanes; and
means to dynamically adjust, based on the read request threshold, a size of a reserved space of a read memory for data to be transferred to in response to the number of read requests, wherein the size of the reserved space is substantially equal to the read request threshold.

18. The storage device of claim 17, further comprising means to track latency.

19. The storage device of claim 17, further comprises means to detect a change in host-device protocol.

20. The storage device of claim 17, further comprising means to adjust an initial value for the read request threshold based on transmitting a data read request.

* * * * *